United States Patent
Chung et al.

(10) Patent No.: US 7,456,788 B2
(45) Date of Patent: Nov. 25, 2008

(54) METHOD AND APPARATUS FOR REDUCING GEOLOCATION AMBIGUITY IN SIGNAL TRACKING

(75) Inventors: Hyo K. Chung, Greenville, TX (US); David L. Reid, Richardson, TX (US)

(73) Assignee: L-3 Communications Integrated Systems L.P., Greenville, TX (US)

(*) Notice: Subject to any disclaimer, the term of this patent is extended or adjusted under 35 U.S.C. 154(b) by 142 days.

(21) Appl. No.: 11/316,299

(22) Filed: Dec. 22, 2005

(65) Prior Publication Data

US 2007/0146203 A1    Jun. 28, 2007

(51) Int. Cl.
    *G01S 3/02*    (2006.01)
(52) U.S. Cl. ........................ 342/451; 342/453
(58) Field of Classification Search ...... 342/357.01–17, 342/451
    See application file for complete search history.

(56) References Cited

U.S. PATENT DOCUMENTS

| | | | |
|---|---|---|---|
| 4,797,679 A | | 1/1989 | Cusdin et al. |
| 5,570,099 A | * | 10/1996 | DesJardins .................. 342/378 |
| 5,914,687 A | | 6/1999 | Rose |
| 6,018,312 A | * | 1/2000 | Haworth ..................... 342/353 |
| 6,204,812 B1 | * | 3/2001 | Fattouche .................. 342/457 |
| 6,401,036 B1 | | 6/2002 | Geier et al. |
| 6,407,703 B1 | | 6/2002 | Minter et al. |
| 6,522,890 B2 | * | 2/2003 | Drane et al. ............. 455/456.5 |
| 6,608,589 B1 | | 8/2003 | Devereux et al. |
| 6,798,381 B2 | | 9/2004 | Benner et al. |
| 6,856,903 B2 | | 2/2005 | Ishigami et al. |
| 6,920,329 B2 | * | 7/2005 | Kennedy et al. ......... 455/456.1 |
| 6,933,888 B1 | | 8/2005 | Schiffmiller et al. |
| 6,944,465 B2 | | 9/2005 | Spain et al. |
| 7,181,323 B1 | | 2/2007 | Boka et al. |
| 2002/0094824 A1 | * | 7/2002 | Kennedy et al. ............ 455/456 |
| 2003/0043073 A1 | * | 3/2003 | Gray et al. .................. 342/465 |
| 2003/0052821 A1 | * | 3/2003 | Holt ........................... 342/453 |
| 2004/0085242 A1 | | 5/2004 | Brousseau et al. |
| 2005/0096845 A1 | * | 5/2005 | Bergin et al. ................ 701/223 |
| 2005/0164712 A1 | * | 7/2005 | Kennedy et al. ......... 455/456.1 |
| 2005/0282540 A1 | * | 12/2005 | Motamedi et al. ........... 455/423 |
| 2006/0125695 A1 | * | 6/2006 | Kennedy et al. ............ 342/465 |

OTHER PUBLICATIONS

Kalman Filter at http://enwikipedia.org/wiki/Kalman_filtering; Accessed and printed out Dec. 22, 2005 (15 pages).
The Kalman Filter at http://www.cs.unc.edu/~welch/kalman; Accessed and printed out Dec. 22, 2005 (5 pages).
Poisel, Richard A. Electronic Warfare Target Location Methods; Artech House, Inc. 2005; Norwood, Massachusetts, pp. 66-70.
Mull, Fred; Office Action dated Aug. 1, 2007; U.S. Appl. No. 11/316,298.
Mull, Fred; Office Action dated Jul. 31, 2005; U.S. Appl. No. 11/446,760.
Liu, Harry K.; Office Action dated Aug. 6, 2007; U.S. Appl. No. 11/316,299.

* cited by examiner

*Primary Examiner*—Thomas H Tarcza
*Assistant Examiner*—Harry Liu
(74) *Attorney, Agent, or Firm*—Hovey Williams LLP

(57) ABSTRACT

A method and apparatus for reducing geolocation ambiguity in signal tracking. The method and apparatus generally include acquiring a first and a second set of geolocations and comparing the sets to reduce ambiguous geolocations. Such a configuration enables accurate and rapid geolocation determination without requiring complex and time-consuming direction finding devices and methods.

3 Claims, 3 Drawing Sheets

Where
  $\tau_i$ – TDOAs
  $v_i$ – FDOAs
  $p_i$ – collection platform position vector
  $v_i$ – collection platform velocity vector
  $r_n$ – algebraic closed-form TDOA/TDOA geolocations
  $r_m$ – algebraic closed-form TDOA/FDOA geolocations
  T – collection platform sensor range
  q – number of TDOA/FDOA geolocation solution(s) within sensor range
  r – unique geolocation solution
  ∩ – intersection of solution sets $r_q$ and $r_m$

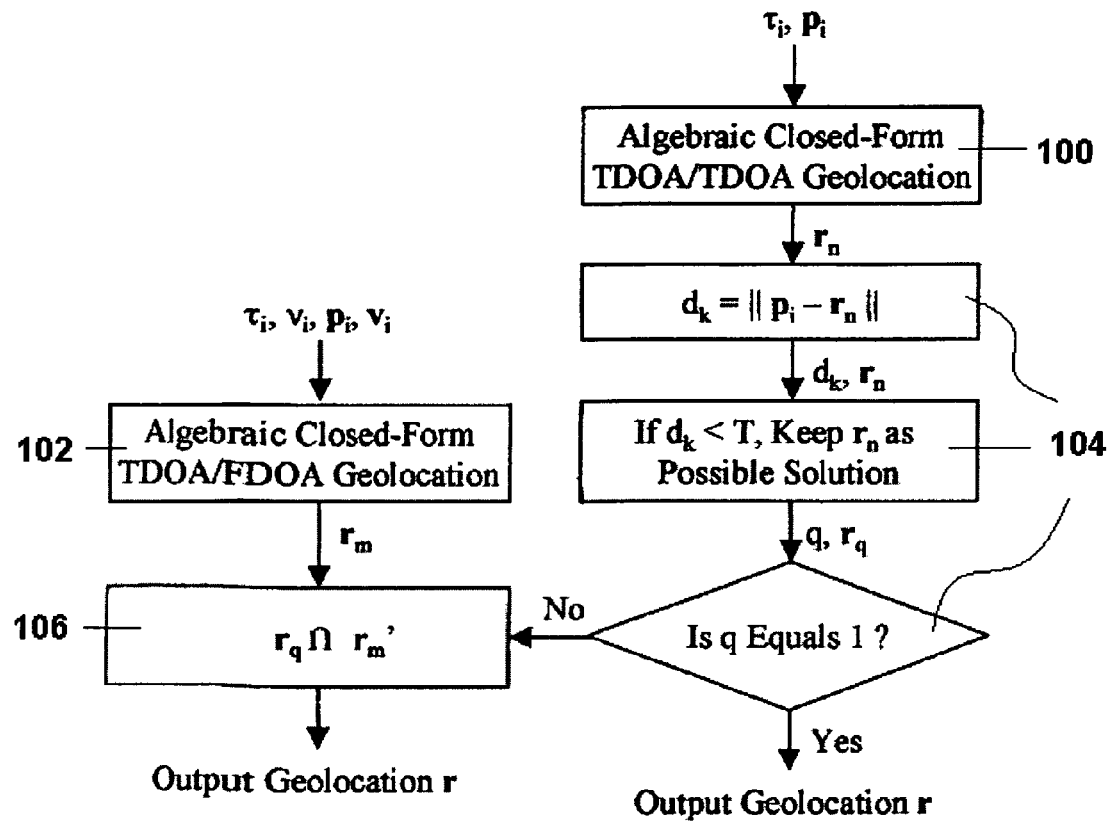

Where
- $\tau_i$ – TDOAs
- $v_i$ – FDOAs
- $p_i$ – collection platform position vector
- $v_i$ – collection platform velocity vector
- $r_n$ – algebraic closed-form TDOA/TDOA geolocations
- $r_m$ – algebraic closed-form TDOA/FDOA geolocations
- T – collection platform sensor range
- q – number of TDOA/FDOA geolocation solution(s) within sensor range
- r – unique geolocation solution
- $\cap$ – intersection of solution sets $r_q$ and $r_m$

FIG. 3

METHOD AND APPARATUS FOR REDUCING GEOLOCATION AMBIGUITY IN SIGNAL TRACKING

COMPUTER PROGRAM LISTING APPENDIX

A computer program listing appendix containing the source code of a computer program that may be used with the present invention is incorporated herein by reference and appended hereto as one (1) original compact disc, and an identical copy thereof, containing a total of 3 files as follows:

| Date of Creation | Size (Bytes) | Filename |
| --- | --- | --- |
| Nov. 25, 2005 | 4,913 | tdoaFdoaSol.c |
| Nov. 25, 2005 | 5,214 | tdoaTdoaSol.c |
| Nov. 25, 2005 | 6,232 | tfttDriver.c |

BACKGROUND OF THE INVENTION

1. Field of the Invention

The present invention relates to signal tracking. More particularly, the invention relates to a method and apparatus for reducing geolocation ambiguity in signal tracking that compares the results of at least two geolocation algorithms to reduce geolocation ambiguities.

2. Description of the Related Art

The ability to determine the source geolocation of emitted signals is becoming increasingly important as the use of wireless communications devices becomes commonplace throughout the world. For example, the U.S. Federal Communications Commission Enhanced 911 (E911) rules will eventually require cellular telephone carriers to identify the geolocations, i.e. the physical source locations, of subscribers who place calls to 911 or other emergency services. Additionally, wireless communication device users often desire to acquire accurate geolocations for navigation purposes, such as to generate a route between a current location and a destination. Further, military and law enforcement agencies often desire to locate sources of emitted signals for tracking and targeting purposes.

Methods and devices have been developed that enable signal geolocations to be determined. Some of these methods include utilizing Global Position System (GPS) elements that must be coupled with signal emitters to determine geolocations, thereby increasing system cost and complexity. Other methods include utilizing one or more collector elements, such as antennas, to generate signal measurements and compute geolocations utilizing the generated signal measurements.

Although utilizing signal measurements enables geolocations to be determined without interfering with signal emitters, the algorithms that utilize signal measurements to determine geolocations produce ambiguous results that often lead to incorrect and inaccurate geolocation determinations. For instance, the often utilized TDOA/TDOA and TDOA/FDOA algorithms each generate a plurality of geolocations, only one of which is an accurate geolocation.

To reduce the number of ambiguities, users generally are required to utilize prior signal information or direction-finding (DF) methods to exclude one or more of the ambiguous results. For instance, after a set of potential geolocations is provided by a TDOA/TDOA algorithm, users may determine the direction of the signal, such as with angle-of-arrival (AOA) or direction-of-arrival (DOA) measurements, and eliminate potential geolocations not corresponding to the determined angle or direction.

Although such methods are generally effective, they are time-consuming and costly as they require knowledge of previous signal characteristics, additional calculations, and/or special hardware to ascertain the direction of the emitted signal. Thus, users are often unable to reduce ambiguous geolocations provided by geolocation algorithms due to the cost and complexity of DF methods and the unavailability of prior signal information.

SUMMARY OF THE INVENTION

The present invention solves the above-described problems and provides a distinct advance in the art of signal tracking. More particularly, the invention provides a method and apparatus to reduce geolocation ambiguity in signal tracking that compares the results of at least two geolocation algorithms to reduce ambiguities. Such a configuration enables accurate and rapid geolocation determination without requiring complex and time-consuming direction finding devices and methods.

One embodiment of the present invention provides a method of reducing geolocation ambiguity in signal tracking. The method generally includes acquiring a first and a second set of geolocations and comparing the sets to reduce ambiguous geolocations. The first set is determined utilizing a first geolocation algorithm and the second set corresponds to the same signal as the first set and is determined utilizing a second geolocation algorithm.

In another embodiment, the method additionally includes ascertaining a collector element range and excluding geolocations within at least one of the sets that exceed the collector element range. Further, the first geolocation algorithm may correspond to an algebraic closed-form time-difference-of-arrival/time-difference-of-arrival algorithm and the second geolocation algorithm may correspond to an algebraic closed-form time-difference-of-arrival/frequency-difference-of-arrival algorithm.

Another embodiment of the present invention provides a computer-readable medium encoded with a computer program for enabling a computer to perform a method of reducing geolocation ambiguity in signal tracking. The method generally includes acquiring a first and a second set of geolocations and comparing the sets to reduce ambiguous geolocations. The first set is determined utilizing a first geolocation algorithm and the second set corresponds to the same signal as the first set and is determined utilizing a second geolocation algorithm.

Another embodiment of the present invention provides a computing element operable to reduce geolocation ambiguity in signal tracking. The computing element includes a memory and a processor coupled with the memory. The memory is operable to store a first set of geolocations determined utilizing a first geolocation algorithm and a second set of geolocations determined utilizing a second geolocation algorithm. The processor is operable to compare the sets to reduce ambiguous geolocations.

Other aspects and advantages of the present invention will be apparent from the following detailed description of the preferred embodiments and the accompanying drawing figures.

BRIEF DESCRIPTION OF THE DRAWING FIGURES

A preferred embodiment of the present invention is described in detail below with reference to the attached drawing figures, wherein:

FIG. 3 is a flow chart showing some of the steps of FIG. 2 in more detail.

Figure 1:
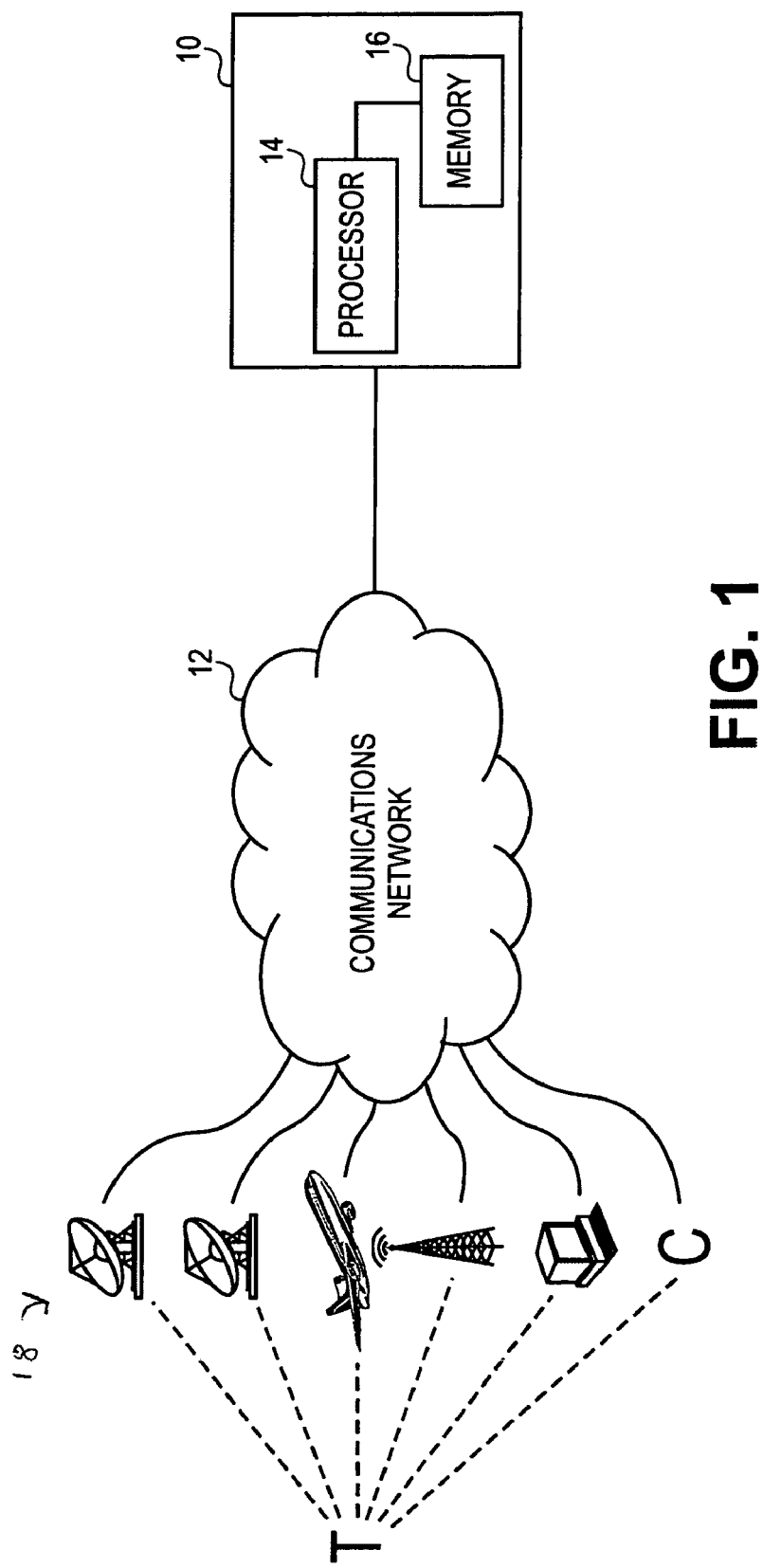
FIG. 1 is a block diagram of some of the elements operable to be utilized by various embodiments of the present invention.

The drawing figures do not limit the present invention to the specific embodiments disclosed and described herein. The drawings are not necessarily to scale, emphasis instead being placed upon clearly illustrating the principles of the invention.

DETAILED DESCRIPTION OF THE PREFERRED EMBODIMENTS

The following detailed description of the invention references the accompanying drawings that illustrate specific embodiments in which the invention can be practiced. The embodiments are intended to describe aspects of the invention in sufficient detail to enable those skilled in the art to practice the invention. Other embodiments can be utilized and changes can be made without departing from the scope of the present invention. The following detailed description is, therefore, not to be taken in a limiting sense. The scope of the present invention is defined only by the appended claims, along with the full scope of equivalents to which such claims are entitled.

Methods consistent with the present teachings are especially well-suited for implementation by a computing element 10, as illustrated in FIG. 1. The computing element 10 may be a part of a communications network 12 that enables various devices to exchange information and data. The computing element 10 may include a processor 14 coupled with a memory 16 to perform the various functions described herein. As should be appreciated, the processor 14 and memory 16 may be integral or discrete and comprise various generally conventional devices, such as microcontrollers, microprocessors, programmable logic devices, desktop computers, servers, portable computing devices, etc.

Additionally, the computing element 10 may include additional devices, such as a display for indicating processed information, i.e. a geolocation, or additional processing and memory elements. Further, the computing element 10 may comprise a plurality of computing elements or a network of computing elements such that one or more portions of the invention may be implemented utilizing a first computing element and one or more other portions of the invention may be implemented utilizing a second computing element.

The present invention can be implemented in hardware, software, firmware, or combinations thereof. In a preferred embodiment, however, the invention is implemented with a computer program. The computer program and equipment described herein are merely examples of a program and equipment that may be used to implement the present invention and may be replaced with other software and computer equipment without departing from the scope of the present teachings. It will also be appreciated that the principles of the present invention are useful independently of a particular implementation, and that one or more of the steps described herein may be implemented without the assistance of the computing element 10.

Computer programs consistent with the present teachings can be stored in or on a computer-readable medium residing on or accessible by the computing element 10, such as the memory 16, for instructing the computing element 10 to implement the method of the present invention as described herein. The computer program preferably comprises an ordered listing of executable instructions for implementing logical functions in the computing element 10 and other computing devices coupled with the computing element 10. The computer program can be embodied in any computer-readable medium for use by or in connection with an instruction execution system, apparatus, or device, such as a computer-based system, processor-containing system, or other system that can fetch the instructions from the instruction execution system, apparatus, or device, and execute the instructions.

The ordered listing of executable instructions comprising the computer program of the present invention will hereinafter be referred to simply as "the program" or "the computer program." It will be understood by persons of ordinary skill in the art that the program may comprise a single list of executable instructions or two or more separate lists, and may be stored on a single computer-readable medium or multiple distinct media.

In the context of this application, a "computer-readable medium", including the memory 16, can be any means that can contain, store, communicate, propagate or transport the program for use by or in connection with the instruction execution system, apparatus, or device. The computer-readable medium can be, for example, but not limited to, an electronic, magnetic, optical, electro-magnetic, infrared, or semi-conductor system, apparatus, device, or propagation medium. More specific, although not inclusive, examples of the computer-readable medium would include the following: an electrical connection having one or more wires, a portable computer diskette, a random access memory (RAM), a read-only memory (ROM), an erasable, programmable, read-only memory (EPROM or Flash memory), an optical fiber, and a portable compact disc (CD) or a digital video disc (DVD). The computer-readable medium could even be paper or another suitable medium upon which the program is printed, as the program can be electronically captured, via for instance, optical scanning of the paper or other medium, then compiled, interpreted, or otherwise processed in a suitable manner, if necessary, and then stored in a computer memory.

As shown in FIG. 1, the computing element 10 is preferably directly or indirectly coupled with one or more collector elements 18 to enable function of the present invention as described herein. It should be appreciated the computing element 10 and the collector elements 18 may be integral such as where one or more of the collector elements 18 are operable to independently perform signal tracking as described herein. Thus, the computing element 10 and collector elements 18 need not necessarily be coupled through the communications network 12 with other devices or collector elements to enable operation of the present invention.

The collector elements 18 may include any devices or elements that are operable to detect and/or otherwise receive an emitted electromagnetic signal. Thus, the collector elements 18 may include stationary and non-stationary antennas, unidirectional and omni-directional antennas, electrical elements operable to relay a signal, etc. In various embodiments the collector elements 18 may comprise a plurality of communication towers, such as cellular-phone towers, associated via the communications network 12. Thus, the present invention is not limited to the utilization of only one type or configuration of collector elements 18.

Figure 2:
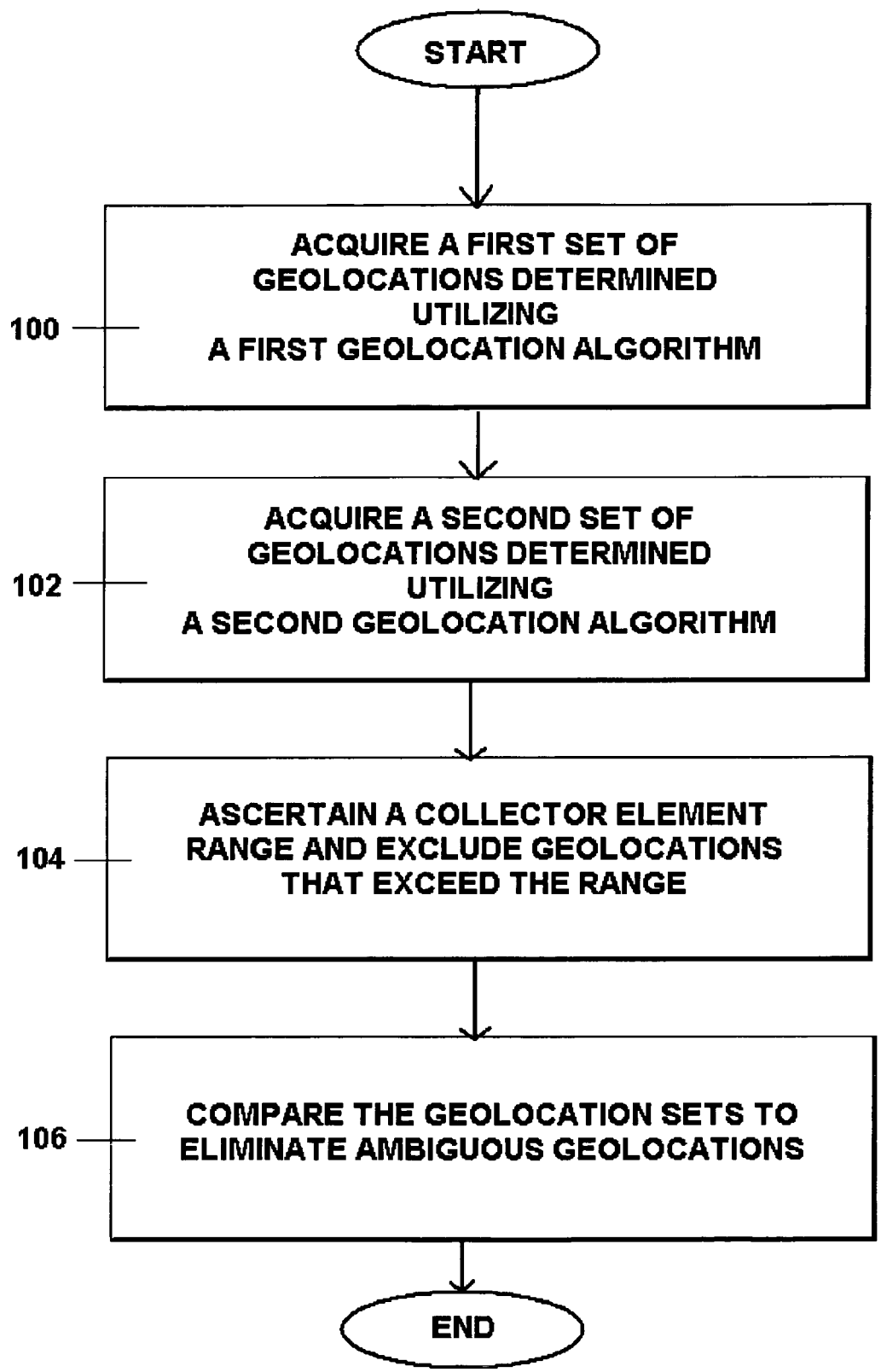
FIG. 2 is a flow chart showing some of the steps operable to be performed by the present invention.

A flowchart of steps that may be utilized by the present invention to determine a geolocation is illustrated in FIGS. 2-3. Some of the blocks of the flow chart may represent a module segment or portion of code of the computer program of the present invention which comprises one or more executable instructions for implementing the specified logical function or functions. In some alternative implementations, the functions noted in the various blocks may occur out of the order depicted in FIGS. 2-3. For example, two blocks shown in succession in FIGS. 2-3 may in fact be executed substantially concurrently, or the blocks may sometimes be executed in the reverse order depending upon the functionality involved.

In step 100, a first set of geolocations corresponding to a signal is acquired. The first set includes, and preferably consists of, geolocations determined utilizing a first geolocation algorithm. The first set may include one or more geolocations with each geolocation generally corresponding to a potential source location for the signal, such as a World Geodetic System of 1984 coordinate or any other reference system, coordinate frame, or location indication. The first set may represented as an ordered or unordered listing or grouping.

The first set may be acquired in step 100 utilizing various methods, including retrieving a previously determined set from the memory 16, receiving the first set from the communications network 12 and/or collector elements 18, calculating the first set utilizing the first geolocation algorithm, etc. Thus, the present invention is not limited to calculating or determining the first set itself.

The first set is determined by the present invention, or by other devices, methods, or elements, utilizing the first geolocation algorithm. Preferably, the first geolocation algorithm is an algebraic closed-form geolocation algorithm that is operable to provide geolocations utilizing one or more signal measurements. In various embodiments, the first geolocation algorithm is a time-difference-of-arrival/time-difference-of-arrival (TDOA/TDOA) closed-form algorithm that is operable to calculate one or more geolocations utilizing one or more TDOA values and a platform (collector) location vector.

Such TDOA/TDOA algorithms are well known in the art and typically provide a n-order polynomial geolocation solution resulting in a plurality of ambiguous geolocations. For instance, the TDOA/TDOA geolocation algorithm may provide n geolocations, where n is greater than 1, and only one of the n geolocations will represent the actual geolocation of the signal and n−1 of the geolocations will not represent the actual geolocation of the signal.

As should be appreciated by those skilled in the art, the acquired first set may be determined utilizing any algorithm or method that provides one or more geolocations, and need not be limited to the TDOA/TDOA algorithm discussed above.

In step 102, a second set of geolocations corresponding to the signal is acquired. The second set is generally similar to the first set and may be acquired in a similar or identical manner, with the exception that the second set is determined utilizing a second geolocation algorithm instead of the first geolocation algorithm. Thus, the second set may include one or more geolocations with each geolocation generally corresponding to a potential source location for the signal, such as a World Geodetic System of 1984 coordinate or any other reference system, coordinate frame, or location indication.

The second geolocation algorithm may be any geolocation algorithm that is different than the first geolocation algorithm and is operable to determine one or more geolocations corresponding to the signal. Preferably, the second geolocation algorithm is an algebraic-form geolocation algorithm that is operable to provide a plurality of geolocations utilizing various signal measurements.

In various embodiments, the second geolocation algorithm is a time-difference-of-arrival/frequency-difference-of-arrival (TDOA/FDOA) closed-form algorithm that is operable to calculate one or more geolocations utilizing one or more TDOA values, platform (collector) velocity vectors, platform (collector) location vectors, and FDOA values. The TDOA/FDOA algorithm is well known in the art and provides a n-order polynomial geolocation solution resulting in a plurality of ambiguous geolocations. As will be appreciated by those skilled in the art, the differences between the TDOA/TDOA and TDOA/FDOA algorithms result in differences between the geolocations presented in the first set and the second set, thereby enabling geolocation ambiguity to be reduced in step 106, discussed below in detail.

As should also be appreciated by those skilled in the art, the acquired second set may be determined utilizing any algorithm or method that is different that the first geolocation algorithm and that provides one or more geolocations. Thus, the second geolocation algorithm need not be limited to the TDOA/FDOA algorithm discussed above. However, utilization of the TDOA/TDOA algorithm as the first geolocation algorithm and utilization of the TDOA/FDOA algorithm as the second geolocation algorithm is preferred as it enables the first and second sets to be easily determined and acquired utilizing widely accepted and commonly available methods.

For instance, the computing element 10 may acquire the sets through the communications network 12 from any device or devices, including various conventional devices, that are operable to generate geolocations utilizing TDOA/TDOA and TDOA/FDOA algorithms. Thus, the present invention does not require specialized or custom systems to reduce ambiguous geolocations.

Steps 100 and 102 may be performed in any order including concurrently. Thus, the first set and the second set may be acquired at generally the same time to facilitate the comparison of step 106. However, in some embodiments it may be desirable for step 100 (and 104 discussed below) to be performed before step 102 to prevent redundant or unnecessary calculations, such as where only one geolocation exists in the first set and the acquisition or determination of the second set is thus not required.

In step 104, a collector element range is acquired and geolocations that exceed the collector element range are excluded from one or more of the sets. The collector element range corresponds to the operational range of the collector or collectors that were utilized to detect the signal. For instance, a first collector element, such as a ground-based antenna, may be operable to receive and/or detect a signal from five miles away such that the first collector would have a collector element range of five miles. As will be appreciated by those skilled in the art, the collector element range for any particular device is dependent upon the configuration and position of the particular device, such that the present invention is not limited to any particular collector element or collector element range.

The collector element range may be acquired through various methods, such as by acquiring the range from one or more of the collector elements 18, receiving the range through the communications network 12, calculating the range based on information relating to the utilized collector, retrieving the range from the memory 16, etc. Thus, the collector element range may be ascertained through any method that acquires the operational range of the collector or collectors utilized to detect the signal corresponding to the geolocation sets.

In various embodiments, the collector element range may be provided in combination with the first and/or second geolocation set. For example, one of the collector elements 18 may determine the first set utilizing a TDOA/TDOA algorithm and concurrently provide its operational range to the processor 14 for utilization with the present invention.

After ascertaining the collector element range, the range is compared to each geolocation within one of the sets and geolocations that exceed the range are excluded from the set. Preferably, step 104 is performed concurrently with or after step 100, but before step 102, such that steps 102 and 106 need not be performed if only one geolocation within the first set is within the collector element range, as the remaining geolocation will correspond to the actual geolocation. However, step 104 may be applied at any time to either geolocation set or both geolocation sets to reduce the complexity of the comparison performed in step 106 or otherwise reduce ambiguous geolocations.

In step 106, the geolocation sets acquired in steps 100 and 102 are compared to reduce ambiguous geolocations. The ambiguous geolocations may be reduced by identifying a non-ambiguous geolocation within one or more of the sets and/or by eliminating ambiguous geolocations from one or more of the sets based upon the comparison.

In various embodiments, the first and second geolocations are compared and geolocations from one set that are not generally represented in the other set may be excluded as ambiguous. For instance, if the first set includes geolocations a, b, and c, and the second set includes geolocations x, y, and c, geolocations a, b, x, and y may be identified as ambiguous geolocations and excluded. Such a comparison may be desirable where it is impossible or difficult to identify a common geolocation in both the first and second set.

Preferably, the sets are compared and ambiguous geolocations are reduced by determining an intersection of the first set and the second set. As is known in the art, the intersection of two sets of data, such as the first set and second set, is the element or elements that are in both sets. The intersection of the first set and the second set will preferably result in a single non-ambiguous geolocation that represents the source location of the signal.

Due to measurement error or other system and algorithm characteristics, the exact geolocation may not be present in both the first set and the second set, even if the geolocation generally represents the actual source location of the signal. In such situations, the present invention is operable to determine the intersection of the first and second set by identifying the most common geolocation within both sets, even if the most common geolocation is not precisely the same. Similarly, the two geolocations that are closest in value between the sets may be averaged together the generate a non-ambiguous geolocation.

After reducing ambiguous geolocations within the sets, the present invention may provide an indication of a non-ambiguous geolocation to a user, store the non-ambiguous geolocation within the memory 16, communicate the non-ambiguous geolocation utilizing the communications network 12, etc. Similarly, the excluded ambiguous geolocations, the first set and the second set lacking the excluded geolocations, or any other indication or representation of ambiguous geolocations may be provided, stored within the memory 16, and communicated through the communications network 12.

Although the invention has been described with reference to the preferred embodiment illustrated in the attached drawing figures, it is noted that equivalents may be employed and substitutions made herein without departing from the scope of the invention as recited in the claims. For example, any number of sets may be compared to reduce geolocation ambiguity, such as three or more sets determined utilizing any combination or number of algorithms.

Having thus described the preferred embodiment of the invention, what is claimed as new and desired to be protected by Letters Patent includes the following:

1. A method of determining a geolocation in signal tracking, the method comprising:
   acquiring a first set of geolocations corresponding to a signal and determined utilizing an algebraic closed form time-difference-of-arrival/time-difference-of-arrival algorithm;
   ascertaining a collector element range;
   producing a reduced first set of geolocations by excluding geolocations within the first set that exceed the collector element range;
   outputting a non ambiguous geolocation, if the reduced first set of geolocations is equal to one;
   performing the following steps if the reduced first set of geolocations is greater than one;
   acquiring a second set of geolocations corresponding to the signal and determined utilizing an algebraic close-form time-difference-of-arrival/frequency-difference-of-arrival algorithm;
   comparing the first set of geolocations and the second set of geolocations;
   producing a common set of geolocations by excluding geolocations that are not common to both the first set of geolocations and the second set of geolocations;
   outputting a non-ambiguous geolocation, if the common set of geolocations is equal to one; and
   averaging the remaining geolocations to produce a non-ambiguous geolocation, if the common set of geolocations is greater than one.

2. A computer-readable medium encoded with a computer program for enabling a computer to perform a method of determining a geolocation in signal tracking, the method comprising:
   acquiring a first set of geolocations corresponding to a signal and determined utilizing an algebraic closed-form time-difference-of-arrival/time-difference-of-arrival algorithm;
   ascertaining a collector element range;
   producing a reduced first set of geolocations by excluding geolocations within the first set that exceed the collector element range;
   outputting a non-ambiguous geolocation, if the reduced first set of geolocations is equal to one;
   performing the following steps if the reduced first set of geolocations is greater than one;
   acquiring a second set of geolocations corresponding to the signal and determined utilizing an algebraic closed-form time-difference-of-arrival/frequency-difference-of-arrival algorithm;
   comparing the first set of geolocations and the second set of geolocations;
   producing a common set of geolocations by excluding geolocations that are not common to both the first set of geolocations and the second set of geolocations;
   outputting a non-ambiguous geolocation, if the common set of geolocations is equal to one; and
   averaging the remaining geolocations to produce a non-ambiguous geolocation, if the common set of geolocations is greater than one.

3. A computing element operable to determine a geolocation in signal tracking, the computing element comprising:
   a memory operable to store—
     a first set of geolocations corresponding to a signal and determined utilizing an algebraic closed-form time-difference-of-arrival/time-difference-of-arrival algorithm,
     a second set of geolocations corresponding to the signal and determined utilizing an algebraic closed-form time-difference-of-arrival/frequency-difference-of-arrival algorithm, and
     a collector element range; and a processor coupled with the memory and operable to—
produce a reduced first set of geolocations by excluding geolocations within the first set that exceed the collector element range,
output a non-ambiguous geolocation, if the reduced first set of geolocations is equal to one,
perform the following steps if the reduced first set of geolocations is greater than one,
compare the first set of geolocations and the second set of geolocations,
produce a common set of geolocations by excluding geolocations that are not common to both the first set of geolocations and the second set of geolocations,
output a non-ambiguous geolocation. if the common set of geolocations is equal to one, and
average the remaining geolocations to produce a non-ambiguous geolocation, if the common set of geolocations is greater than one.

* * * * *